United States Patent
Bray et al.

(10) Patent No.: US 10,370,042 B2
(45) Date of Patent: Aug. 6, 2019

(54) ADJUSTABLE AERODYNAMIC ASSEMBLY AND A METHOD

(71) Applicant: GM GLOBAL TECHNOLOGY OPERATIONS LLC, Detroit, MI (US)

(72) Inventors: Samantha J. Bray, Northville, MI (US); Joshua R. Auden, Brighton, MI (US); Jason D. Fahland, Fenton, MI (US); Timothy D. Demetrio, Highland, MI (US); Caleb Potvin, Sterling Heights, MI (US); Rebecca Tjoelker, Commerce Charter Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 73 days.

(21) Appl. No.: 15/666,611

(22) Filed: Aug. 2, 2017

(65) Prior Publication Data
US 2019/0039663 A1    Feb. 7, 2019

(51) Int. Cl.
*B62D 35/00* (2006.01)
*B60T 17/22* (2006.01)
(Continued)

(52) U.S. Cl.
CPC .......... *B62D 35/005* (2013.01); *B60T 17/22* (2013.01); *B62D 35/02* (2013.01); *G01D 5/00* (2013.01); *B60T 1/16* (2013.01)

(58) Field of Classification Search
CPC ........ B62D 35/005; B62D 35/02; G01D 5/00; B60T 17/22; B60T 1/16
See application file for complete search history.

(56) References Cited

U.S. PATENT DOCUMENTS

| | | | | |
|---|---|---|---|---|
| 4,810,022 A | * | 3/1989 | Takagi | B62D 35/005 180/197 |
| 9,950,754 B2 | * | 4/2018 | Povinelli | B62D 35/02 |

(Continued)

OTHER PUBLICATIONS

Giovino, Bill. "Robots Assume the Position with Sensors", Mouser Electronics—Robotics Technology. Archived Apr. 11, 2016. See attached PDF version.*

*Primary Examiner* — Nadeem Odeh
*Assistant Examiner* — Michael V Kerrigan
(74) *Attorney, Agent, or Firm* — Quinn IP Law

(57) ABSTRACT

An adjustable aerodynamic assembly includes a support structure and a blocking member supported by the support structure. The blocking member is movable between an extended position in which the blocking member is disposed transverse to the support structure to interact with an airflow and a retracted position in which the blocking member retracts to minimize interaction with the airflow. The adjustable aerodynamic assembly also includes an actuator coupled to the blocking member and configured to move the blocking member to the extended and retracted positions, and a detection member coupled to the blocking member and configured to determine whether a surface of the blocking member is detected. A method of monitoring the adjustable aerodynamic assembly includes determining whether the surface of the blocking member is detected via the detection member. The method also includes selectively activating the actuator to move the blocking member to the extended and retracted positions.

20 Claims, 2 Drawing Sheets

(51) Int. Cl.
    *B62D 35/02*    (2006.01)
    *G01D 5/00*     (2006.01)
    *B60T 1/16*     (2006.01)

(56) References Cited

U.S. PATENT DOCUMENTS

2013/0238198 A1* 9/2013 Prentice ................ B62D 35/02
                                                        701/49
2017/0036709 A1* 2/2017 Metka .................. B62D 35/001

* cited by examiner

ADJUSTABLE AERODYNAMIC ASSEMBLY AND A METHOD

INTRODUCTION

Vehicles have been designed with aerodynamic systems, such as an adjustable spoiler which can change the downforce applied to the vehicle.

SUMMARY

The present disclosure provides an adjustable aerodynamic assembly including a support structure and a blocking member supported by the support structure. The blocking member includes a surface. The blocking member is movable between an extended position in which the blocking member is disposed transverse to the support structure to interact with an airflow and a retracted position in which the blocking member retracts to minimize interaction with the airflow. The adjustable aerodynamic assembly also includes an actuator coupled to the blocking member and configured to move the blocking member to the extended and retracted positions. The adjustable aerodynamic assembly further includes a detection member coupled to the blocking member and configured to determine whether the surface of the blocking member is detected.

The adjustable aerodynamic assembly optionally includes one or more of the following:

A) a controller in communication with the actuator such that information regarding the position of the blocking member due to movement from the actuator is conveyed to the controller, and in communication with the detection member such that information whether the surface of the blocking member is detected via the detection member is conveyed to the controller;

B) the blocking member being disposed in a breakaway position in response to a force applied to the blocking member;

C) the breakaway position being detected via the detection member and communicated to the controller;

D) the surface of the blocking member being movable to the breakaway position;

E) at least part of the surface of the blocking member being detachable from the support structure when in the breakaway position;

F) an indicator in communication with the controller;

G) the indicator activates when the controller communicates to the indicator that the blocking member is in the breakaway position;

H) the blocking member includes a first side and a second side opposing the first side;

I) the blocking member being movable between the extended and retracted positions to change a direction of airflow relative to the first side of the blocking member;

J) the surface being disposed along one of the first side and the second side;

K) the detection member includes a sensor configured to determine whether the surface of the first side of the blocking member is detected;

L) the sensor includes a load sensor configured to determine whether the surface of the first side of the blocking member is detected;

M) the sensor includes a brake applied sensor configured to determine whether the surface of the first side of the blocking member is detected;

N) the sensor includes a plurality of sensors configured to determine whether the surface of the first side of the blocking member is detected;

O) the detection member includes a switch configured to determine whether the surface of the first side of the blocking member is detected;

P) the detection member includes a laser configured to determine whether the surface of the first side of the blocking member is detected;

Q) the detection member includes a camera configured to determine whether the surface of the first side of the blocking member is detected;

R) the detection member includes a pitot tube configured to determine whether the airflow that passes the surface of the blocking member is detected;

S) the detection member includes an inertia measurement unit configured to determine whether the surface of the first side of the blocking member is detected; and T) the surface being disposed along the first side of the blocking member.

The present disclosure also provides a method of monitoring an adjustable aerodynamic assembly. The method includes determining whether a surface of a blocking member is detected via a detection member. The blocking member is supported by a support structure and the detection member is coupled to the blocking member. The blocking member is movable between an extended position in which the blocking member is disposed transverse to the support structure to interact with an airflow and a retracted position in which the blocking member retracts to minimize interaction with the airflow. The method also includes selectively activating an actuator to move the blocking member to the extended and retracted positions. The actuator is coupled to the blocking member.

The method optionally includes one or more of the following:

A) communicating with the actuator via a controller such that information regarding the position of the blocking member due to movement from the actuator is conveyed to the controller;

B) communicating with the detection member via the controller such that information whether the surface of the blocking member is detected via the detection member is conveyed to the controller;

C) disposing the blocking member in a breakaway position in response to a force applied to the blocking member;

D) the breakaway position of the blocking member is different from the position conveyed via the actuator regarding the blocking member;

E) determining whether the surface of the blocking member is detected further includes detecting the breakaway position via the detection member and communicating the breakaway position to the controller;

F) activating an indicator when the controller receives information that the blocking member is in the breakaway position and the actuator conveys that the blocking member is in a position different from the breakaway position;

G) the blocking member includes a first side and a second side opposing the first side;

H) the blocking member being movable between the extended and retracted positions to change a direction of airflow relative to the first side of the blocking member; and I) the surface being disposed along the first side of the blocking member.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
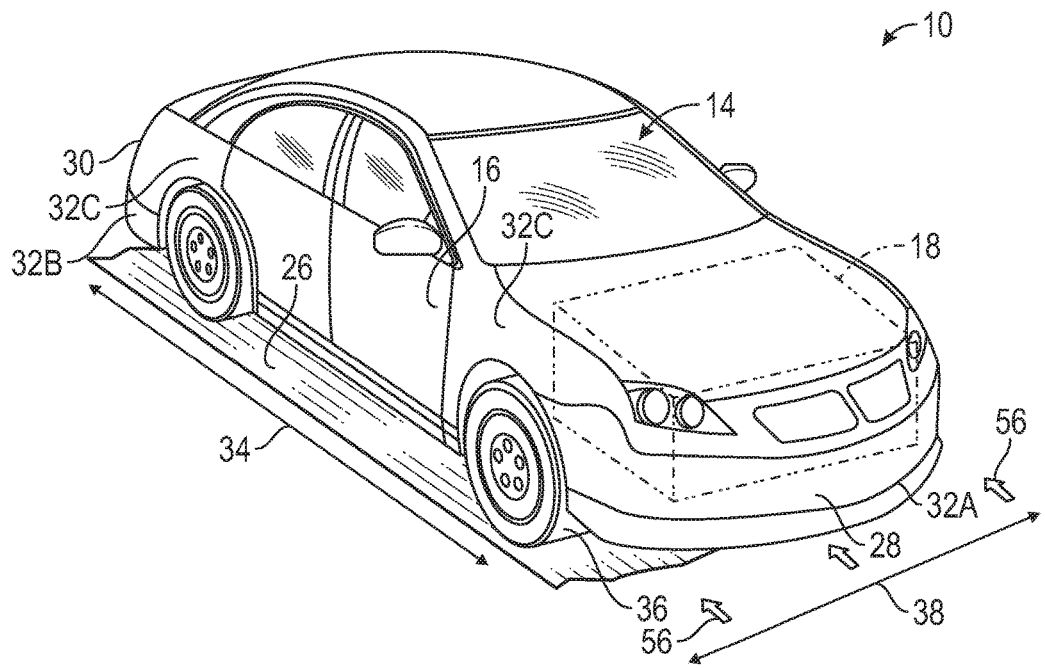
FIG. 1 is a schematic perspective view of a vehicle.
Figure 2:
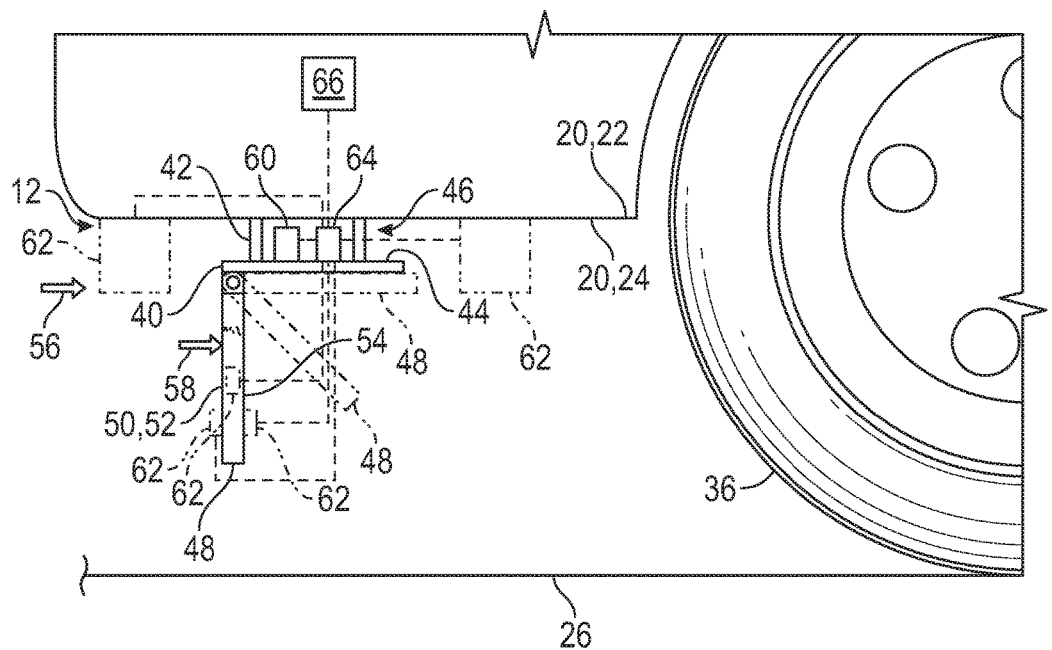
FIG. 2 is a schematic illustration of part of the vehicle and an adjustable aerodynamic assembly.
Figure 3:
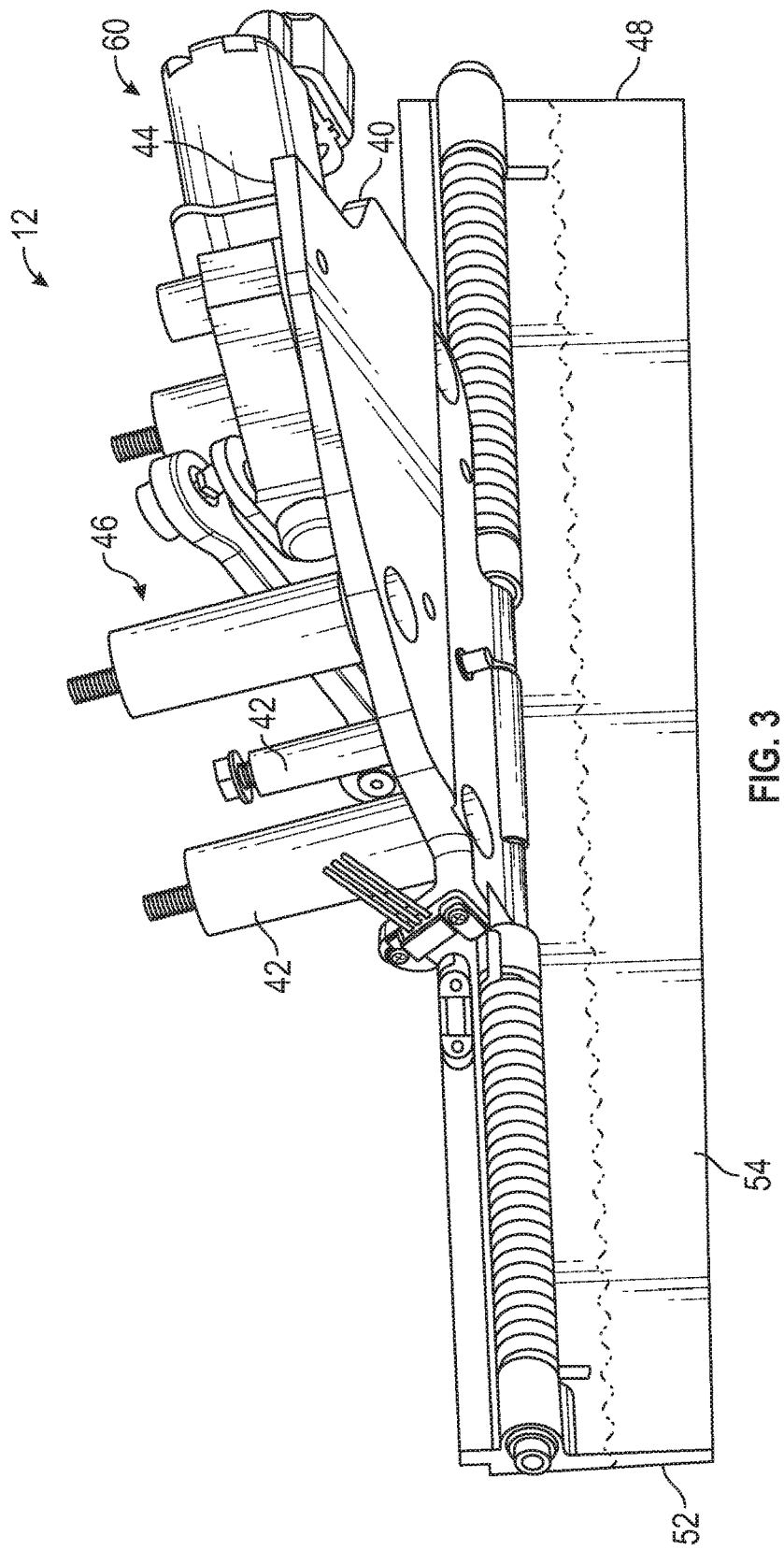
FIG. 3 is a schematic perspective view of the adjustable aerodynamic assembly.

Referring to the FIGS., wherein like numerals indicate like or corresponding parts throughout the several views, a vehicle 10 is generally shown in FIG. 1 and an adjustable aerodynamic assembly 12 is generally shown in FIGS. 2 and 3.

The adjustable aerodynamic assembly 12 can be utilized in a vehicle application or a non-vehicle application. Non-limiting examples of the vehicles 10 can include cars, trucks, off-road vehicles, motorcycles, aircrafts, farm equipment or any other suitable movable platform. Additionally, the vehicle 10 can include autonomously driven vehicles or vehicles driven via a human. Non-limiting examples of the non-vehicles can include machines, farm equipment or any other suitable non-vehicle.

For the vehicle application as shown in FIG. 1, the vehicle 10 can include a passenger compartment 14. Generally, one or more occupants can be disposed in the passenger compartment 14. Furthermore, for a vehicle 10 driven by the human, one of the occupants can steer the vehicle 10 from the passenger compartment 14. The passenger compartment 14 can have one or more doors 16 that open and close to allow the occupants to enter and exit the vehicle 10.

Referring to FIGS. 1 and 2, the vehicle 10 can also include an interior compartment 18 and a bottom panel 20 that defines a bottom of the interior compartment 18. In certain embodiments, the interior compartment 18 can be an engine compartment or a storage compartment.

Additionally, the bottom panel 20 can include an inner surface 22 facing the interior compartment 18 and an outer surface 24 opposing the inner surface 22 to face away from the interior compartment 18. Therefore, generally, the outer surface 24 of the bottom panel 20 faces the ground 26 that the vehicle 10 travels over. In certain embodiments, the bottom panel 20 can include a belly pan.

Referring to FIG. 1, the vehicle 10 can include a front end 28 and a rear end 30, with a plurality of fascia pieces or panels 32, some or all of which are visible from the outside of the passenger compartment 14 of the vehicle 10. The front and rear ends 28, 30 are spaced from each other along a length 34 of the vehicle 10. Generally, the fascia pieces or panels 32 surround the vehicle 10. The vehicle 10 can also include one or more wheels 36, and therefore, depending on the number of wheels 36 that the vehicle 10 utilizes, one or more of the fascia pieces can be configured to allow the wheel 36 to be disposed under part of the vehicle 10.

The fascia pieces or panels 32 can include one or more of: a front panel 32A which can include a front bumper fascia, a rear panel 32B which can include a rear bumper fascia, and side panel(s) 32C which can include front quarter panel fascia(s) and rear quarter panel fascia(s). FIG. 1 best illustrates one side of the vehicle 10, and it is to be appreciated that the other side of the vehicle 10 can be a mirror image of the illustrated side. The sides of the vehicle 10 are spaced from each other in a cross-car direction 38. The cross-car direction 38 is transverse or perpendicular to the length 34 of the vehicle 10. In other words, the rear and front quarter panel fascias along one side of the vehicle 10 are spaced in the cross-car direction 38 from the rear and front quarter panel fascias along the other side of the vehicle 10.

Generally, the front bumper fascia can be disposed along the front end 28 of the vehicle 10 and the rear bumper fascia can be disposed along the rear end 30 of the vehicle 10. Therefore, the front quarter panel fascia(s) can be disposed adjacent to the front bumper fascia and the rear quarter panel fascia(s) can be disposed adjacent to the rear bumper fascia.

The adjustable aerodynamic assembly 12 includes a support structure 40. The support structure 40 can be secured to a component. In the vehicle application, the support structure 40 is secured to part of the vehicle 10, and thus the component can be part of the vehicle 10. For example, in certain embodiments, the support structure 40 can be secured to the bottom panel 20 of the vehicle 10. The support structure 40 is fixed to the component by any suitable methods, and non-limiting examples can include one or more of fastener(s), welding, adhesive, coupler(s), press fit, interference fit, etc., and combinations thereof.

Furthermore, the support structure 40 can be any suitable configuration. For illustrative purposes only, the support structure 40 of FIG. 3 can include one or more spacers 42 extending outwardly from an inner surface 44 of the support structure 40 to define a space 46 between the inner surface 22 of the support structure 40 and the component. In the vehicle application, the inner surface 44 of the support structure 40 can face the outer surface 24 of the bottom panel 20. The attachment point of the support structure 40 to the component can be located at respective ends of the spacers 42 that are spaced from the inner surface 44 of the support structure 40.

Referring to FIGS. 2 and 3, the adjustable aerodynamic assembly 12 also includes a blocking member 48 supported by the support structure 40, and the blocking member 48 includes a surface 50. In certain embodiments, the blocking member 48 can include a first side 52 and a second side 54 opposing the first side 52. For example, the surface 50 can be disposed along one of the first side 52 and the second side 54. In certain embodiments, the surface 50 is disposed along the first side 52 of the blocking member 48. In other embodiments, the surface 50 is disposed along the second side 54 of the blocking member 48. Furthermore, it is to be appreciated that a plurality of surfaces 50 can be disposed along the blocking member.

In the vehicle application, the first side 52 of the blocking member 48 can face toward the front end 28 of the vehicle 10 and the second side 54 of the blocking member 48 can face toward the rear end 30 of the vehicle 10. The blocking member 48 can be utilized under the vehicle 10 to adjust the aerodynamics of the vehicle 10. For example, the blocking member 48 can be disposed in front of one of the wheels 36 of the vehicle 10 or disposed behind one of the wheels 36 of the vehicle 10. It is to be appreciated that a plurality of adjustable aerodynamic assemblies 12 can be utilized, and respective blocking members 48 can be disposed in front of respective wheels 36 of the vehicle 10 and/or behind respective wheels 36 of the vehicle 10. As another example, the blocking member 48 can be disposed between respective wheels 36 of the vehicle 10. If utilizing a plurality of adjustable aerodynamic assemblies 12, one or more blocking members 48 can be disposed between respective wheels 36 of the vehicle 10.

The blocking member 48 can be any suitable configuration. For example, in certain embodiments, the blocking member 48 includes a strip including the first and second sides 52, 54. The strip can include a length that is greater than a thickness of the strip. Furthermore, optionally, the length can be greater than a height of the strip.

Referring to FIG. 2, the blocking member 48 is movable between an extended position in which the blocking member 48 is disposed transverse to the support structure 40 to interact with an airflow 56 (see arrow labeled 56 in FIG. 2) and a retracted position in which the blocking member 48 retracts to minimize interaction with the airflow 56. In certain embodiments, the blocking member 48 can be movable between the extended and retracted positions to change a direction of airflow 56 relative to the first side 52 of the blocking member 48. The blocking member 48 can interact with the airflow 56 to adjust the aerodynamics of the vehicle application or non-vehicle application. The blocking member 48 can reduce drag and/or change the performance of the vehicle 10, and/or increase downforce, and/or improve fuel efficiency. Additionally, since the blocking member 48 is movable, the blocking member 48 can be retracted to the retracted position if additional ground clearance is needed to pass a particular part of the ground 26. For example, if the ground 26 is bumpy or an approach is steep, the blocking member 48 can be retracted to provide additional ground clearance. Furthermore, having the blocking member 48 movable can extend the life of the blocking member 48 because the blocking member 48 can be moved out of the way.

The extended position can be any position that is not the retracted position. The extended position can include the blocking member 48 being fully extended or partially extended. FIG. 2 illustrates the extended position in solid lines, where the blocking member 48 is fully extended; for example, the blocking member 48 is substantially perpendicular to the support structure 40. FIG. 2 also illustrates the retracted position in phantom lines; for example, the blocking member 48 is substantially parallel to the support structure 40. The extended position can include when the blocking member 48 is disposed transverse to the support structure 40, but not including the retracted position. For illustrative purposes only, FIG. 2 also illustrates the blocking member 48 at an angle between the fully extended position and the retracted position in phantom lines, which can represent the blocking member 48 being partially extended. It is to be appreciated that the blocking member 48 can rotate to the extended position in other directions than illustrated.

In certain situations, the blocking member 48 can be disposed in a breakaway position in response to a force 58 (see arrow labeled 58 in FIG. 2) applied to the blocking member 48. For example, the force 58 applied to the blocking member 48 can be caused by an object. When the blocking member 48 is in the breakaway position, the blocking member 48 is not disposed in the desired position and aerodynamics can be affected.

The breakaway position can cause different responses to the blocking member 48. For example, the surface 50 of the blocking member 48 can be movable to the breakaway position. As one non-limiting example, if the blocking member 48 is expected to be in the fully extended position but is instead actually in the partially extended position, then the blocking member 48 is in the breakaway position. Therefore, for example, the partially extended position of the blocking member 48 in FIG. 2 can also represent the breakaway position, as well as the retracted position. Additionally, the fully extend position of the blocking member 48 can also represent the breakaway position if the blocking member 48 was expected to be in a different position, such as the partially extended position. As another example, at least part of the surface 50 of the blocking member 48 can be detachable from the support structure 40 when in the breakaway position. For illustrative purposes only, FIGS. 2 and 3 illustrate a corrugated line in phantom lines to provide an example of where the blocking member 48 can detach. It is to be appreciated less or more of the blocking member 48 as illustrated can be detachable, and non-limiting examples can be when the blocking member 48 defines a notch, a groove, when a corner of the blocking member 48 has been detached, etc.

Referring to FIGS. 2 and 3, the adjustable aerodynamic assembly 12 further includes an actuator 60 coupled to the blocking member 48 and configured to move the blocking member 48 to the extended and retracted positions. The actuator 60 can be disposed in the space 46 defined by the spacers 42, and in certain embodiments, supported via the support structure 40. In other embodiments, the actuator 60 can be supported via the support structure 40 on the opposite side of the space 46. In yet other embodiments, the actuator 60 can be supported via the blocking member. The actuator 60 can be a passive system or an active system. The blocking member 48 can be preset to a position or adjusted during movement of the vehicle 10.

Furthermore, the actuator 60 can cause the blocking member 48 to move in response to the force 58 applied to the blocking member 48. Therefore, as one non-limiting example, the actuator 60 can include a biasing member or be spring actuated in response to the force 58 applied to the blocking member 48. As such, for example, the force 58 applied to the blocking member 48 overcomes the spring bias of the actuator 60, and once that occurs, the spring bias takes over moving the blocking member 48 to the breakaway position.

Additionally, actuation of the actuator 60 can be via a switch inside the passenger compartment 14 or via a vehicle system. Therefore, the switch can be in communication with the actuator 60. For example, the occupant can determine the desired position of the blocking member 48 in the extended position or the retracted position when the vehicle 10 is in motion or when the vehicle 10 is stationary. The switch can be any suitable configuration, and non-limiting examples can include a touch screen, a button, etc. During the driving or operation of the vehicle 10, the vehicle system can determine the optimal position of the blocking member 48 for aerodynamic purposes and automatically activate the actuator 60 to move the blocking member 48 to the optimal position. Therefore, the actuator 60 can include a motor, a hydraulic system or any other suitable actuator to allow movement of the blocking member 48.

Continuing with FIGS. 2 and 3, the adjustable aerodynamic assembly 12 also includes a detection member 62 coupled to the blocking member 48 and configured to determine whether the surface 50 of the blocking member 48 is detected. Therefore, the detection member 62 can determine which position the blocking member 48 is disposed in via the surface 50. For example, the detection member 62 can determine that the blocking member 48 is in the extended position, the retracted position or the breakaway position. With regard to the breakaway position, the detection member 62 can detect whether the surface 50 has been detached and/or detect whether the surface 50 is in a position not expected. As discussed above, the surface 50 of the blocking member 48 can be along the first side 52 or the second side 54. Furthermore, more than one surface 50 of the blocking member can be utilized for detection. Therefore, the detection member 62 can be any suitable location and utilize any suitable surface(s) 50.

In certain embodiments, the detection member 62 can be attached to the blocking member 48. For example, the detection member 62 can be directly attached to the blocking member 48, integrated into the blocking member 48 or indirectly attached to the blocking member 48. In other embodiments, the detection member 62 can be spaced from the blocking member 48. Examples of schematic detection members 62 at different locations are illustrated in FIG. 2, and can be representative of the specific detection members 62 discussed below. One detection member 62 can be utilized with one blocking member 48, or alternatively, a plurality of detection members 62 can be utilized with one blocking member 48. The detection member(s) 62 can be any suitable configuration, and non-limiting examples of suitable types of detection members 62 are discussed below. When utilizing a plurality of detection members 62, different types of detection members 62 can be utilized with one blocking member 48.

In certain embodiments, the detection member 62 can include a sensor that can be configured to determine whether the surface 50 of the first side 52 of the blocking member 48 is detected. Therefore, the sensor can detect the position of the blocking member 48 and/or whether at least part of the blocking member 48 has been detached. Various types of sensors can be utilized, and below are non-limiting examples. Generally, the sensors discussed below are attached directly or indirectly to the blocking member 48, or integrated into the blocking member 48.

For example, the sensor can include a load sensor that can be configured to determine whether the surface 50 of the first side 52 of the blocking member 48 is detected. As another example, the sensor can include a force sensor or strain gauge that can be configured to determine whether the surface 50 of the first side 52 of the blocking member 48 is detected. Specifically, the load sensor, the force sensor and the strain gauge can determine the force 58 applied to the surface 50 to indicate which position the blocking member 48 is disposed in and/or whether at least part of the surface 50 is detached. As yet another example, the sensor can include a brake applied sensor that can be configured to determine whether the surface 50 of the first side 52 of the blocking member 48 is detected. As yet another example, the sensor can include an absolute position sensor that can be configured to determine whether the surface 50 of the first side 52 of the blocking member 48 is detected. Specifically, the brake applied sensor and the absolute position sensor can determine which position the blocking member 48 is disposed in and/or whether at least part of the surface 50 is detached. As yet another example, the sensor can include a plurality of sensors that can be configured to determine whether the surface 50 of the first side 52 of the blocking member 48 is detected. Therefore, one or more of the sensors, the load sensor, the brake applied sensor and the absolute position sensor can be utilized. When utilizing a plurality of sensors, the sensors can cooperate to compare the data compiled by each regarding the position of the blocking member 48. If the information complied by the sensors is different, then the blocking member 48 is in the breakaway position.

In other embodiments, the detection member 62 can include a switch that can be configured to determine whether the surface 50 of the first side 52 of the blocking member 48 is detected. Specifically, the switch determines whether the blocking member 48 is in the expected position or not. In certain embodiments, the switch can include a limit switch. The switch can be attached directly or indirectly to the blocking member 48, or integrated into the blocking member 48.

Furthermore, in other embodiments, the detection member 62 can include a laser that can be configured to determine whether the surface 50 of the first side 52 of the blocking member 48 is detected. Specifically, the laser can be mounted to the component and positioned to face the surface 50, and the laser can determine the location of the surface 50 and/or whether at least part of the surface 50 is detached. Additionally, in other embodiments, the detection member 62 can include a camera that can be configured to determine whether the surface 50 of the first side 52 of the blocking member 48 is detected. Specifically, the camera can be mounted to the component and positioned to face the surface 50, and the camera can determine the location of the surface 50 and/or whether at least part of the surface 50 is detached. As shown in FIG. 2, two phantom boxes are illustrated, one in front of the first side 52 and another behind the second side 54, and each of the boxes are spaced from the blocking member 48. The laser and/or the camera can be disposed in either or both of these locations.

As another example, in certain embodiments, the detection member 62 can include a pitot tube that can be configured to determine whether the airflow 56 that passes the surface 50 of the blocking member 48 is detected. Specifically, the pitot tube can be mounted to the component and positioned to face the surface 50, and the pitot tube can determine if the surface 50 is diverting the airflow 56 as expected, which can indicate the position of the surface 50 and/or whether at least part of the surface 50 is detached. As shown in FIG. 2, two phantom boxes are illustrated, one in front of the first side 52 and another behind the second side 54, and each of the boxes are spaced from the blocking member 48. The pitot tube can be disposed in either or both of these locations. It is to be appreciated that a plurality of pitot tubes can be utilized, and in certain embodiments, each of the pitot tubes can be disposed in front of the first side 52 and/or each of the pitot tubes can be disposed behind the second side 54.

Furthermore, for example, in various embodiments, the detection member 62 can include an inertia measurement unit (IMU) that can be configured to determine whether the surface 50 of the first side 52 of the blocking member 48 is detected. Specifically, the IMU can determine which position the blocking member 48 is disposed in and/or whether at least part of the surface 50 is detached. Generally, the IMU is attached directly or indirectly to the blocking member 48, or integrated into the blocking member 48. It is to be appreciated that a plurality of IMUs can be utilized.

In certain embodiments, the adjustable aerodynamic assembly 12 can include a controller 64 (see FIG. 2) in communication with the actuator 60 such that information regarding the position of the blocking member 48 due to movement from the actuator 60 is conveyed to the controller 64, and in communication with the detection member 62 such that information whether the surface 50 of the blocking member 48 is detected via the detection member 62 is conveyed to the controller 64. The controller 64 can compare the information from the actuator 60 and the detection member 48 to determine whether the information matches or whether the information is different from each other. Simply stated, it is desirable to determine whether the blocking member 48 is in the breakaway position. For example, the breakaway position can be detected via the detection member 62 and communicated to the controller 64. As another example, when the actuator 60 and the detection member 62 identify different positions of the blocking member 48 and/or that at least part of the blocking member 48 is detached, then the blocking member 48 is in the breakaway position.

The controller 64 can be disposed in the space 46 defined by the spacers 42, and in certain embodiments, supported via the support structure 40. It is to be appreciated that the controller 64 can be in any suitable location and be any suitable configuration.

When utilizing a plurality of detection members 62 and/or actuators 60, one controller 64 can be in communication with all of the detection members 62 and/or actuators 60, or alternatively, a plurality of controllers 64 can be utilized, with one of the controllers 64 in communication with one of the detection members 62, and another one of the controllers 64 in communication with another one of the detection members 62, and yet another one of the controllers 64 in communication with one of the actuators 60, and yet another one of the controllers 64 in communication with another one of the actuators 60, etc. Also, if utilizing a plurality of controllers 64, each of the controllers 64 can be in communication with each other.

The controller 64 can include a processor and a memory on which is recorded instructions for communicating with the actuator(s) 60, the controller(s) 64, the detection member(s) 62, etc. The controller 64 is configured to execute the instructions from the memory, via the processor. For example, the controller 64 can be a host machine or distributed system, e.g., a computer such as a digital computer or microcomputer, and/or as a proportional-integral-derivative (PID) controller device having the processor, and, as the memory, tangible, non-transitory computer-readable memory such as read-only memory (ROM) or flash memory. The controller 64 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 64 can include all software, hardware, memory, algorithms, connections, sensors, etc., necessary to communicate with the actuator(s) 60, the controller(s) 64, the detection member(s) 62, etc. It is to be appreciated that the controller 64 can also include any device capable of analyzing data from various sensors, comparing data, making the necessary decisions required to communicate with the actuator(s) 60, the controller(s) 64, the detection member(s) 62, etc.

Continuing with FIG. 2, the adjustable aerodynamic assembly 12 can further include an indicator 66 in communication with the controller 64. The indicator 66 can activate when the controller 64 communicates to the indicator 66 that the blocking member 48 is in the breakaway position. The indicator 66 can include a visual indicator, a sound indicator and/or any other suitable indicator. If the blocking member 48 is in the breakaway position and the indicator 66 is activated, the blocking member 48 can be serviced. For example, the blocking member 48 can be replaced or reset when serviced.

The present disclosure also provides a method of monitoring the adjustable aerodynamic assembly 12. The method includes determining whether the surface 50 of the blocking member 48 is detected via the detection member 62. As discussed above, the blocking member 48 is supported by the support structure 40, and the detection member 62 is coupled to the blocking member 48. As also discussed above, the blocking member 48 is movable between the extended position and the retracted position.

The method also includes selectively activating the actuator 60 to move the blocking member 48 to the extended and retracted positions. As discussed above, the actuator 60 is coupled to the blocking member 48.

The method can further include communicating with the actuator 60 via the controller 64 such that information regarding the position of the blocking member 48 due to movement from the actuator 60 is conveyed to the controller 64. The method can also include communicating with the detection member 62 via the controller 64 such that information whether the surface 50 of the blocking member 48 is detected via the detection member 62 is conveyed to the controller 64. The detection member 62 can detect whether the surface 50 is in the desired position and/or whether at least part of the surface 50 has been detached. As discussed above, the detection member 62 can be configured to detect more than one surface 50 of the blocking member 48, which can further assist in determining whether the blocking member 48 is in the desired position and/or whether at least part of one or more surfaces 50 of the blocking member 48 has been detached.

Additionally, the method can include disposing the blocking member 48 in the breakaway position in response to the force 58 applied to the blocking member 48. The breakaway position of the blocking member 48 is different from the position conveyed via the actuator 60 regarding the blocking member 48. Therefore, determining whether the surface 50 of the blocking member 48 is detected can further include detecting the breakaway position via the detection member 62 and communicating the breakaway position to the controller 64. In certain embodiments, the breakaway position of the blocking member 48 is conveyed to the controller 64 via the detection member 62. As discussed above, the detection member 62 can detect whether the surface 50 has been detached and/or detect whether the surface 50 is in a position not expected. In certain embodiments, the position detected via the actuator 60 and the position detected via the detection member 62 can be compared via the controller 64. If the positions compared via the controller 64 is different, then the blocking member 48 is in the breakaway position. Furthermore, if the position detected via the actuator 60 and the detection member 62 detects that at least part of the surface 50 of the blocking member 48 is detached, then the blocking member 48 is in the breakaway position.

The method can also include activating the indicator 66 when the controller 64 receives information that the blocking member 48 is in the breakaway position and the actuator 60 conveys that the blocking member 48 is in a position different from the breakaway position. The positions detected via the actuator 60 and the detection member 62 which are communicated to the controller 64 can be repeated until it is determined that the blocking member 48 is in the breakaway position and the actuator 60 conveys that the blocking member 48 is in the position different from the breakaway position.

It is to be appreciated that the order or sequence of performing the method as discussed above is for illustrative purposes, and other orders or sequences are within the scope of the present teachings.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An adjustable aerodynamic assembly comprising:
a support structure;
one or more spacers that extend outwardly from the support structure to define a space;
a blocking member supported by the support structure and including a surface;
wherein the blocking member is movable between an extended position in which the blocking member is disposed transverse to the support structure to interact with an airflow and a retracted position in which the blocking member retracts to minimize interaction with the airflow;
wherein the blocking member is movable between the extended position and the retracted position about a single pivot point;
an actuator disposed in the space and secured to the support structure, and the actuator is coupled to the blocking member;
wherein the actuator is configured to move the blocking member to the extended position and the retracted position about the single pivot point; and
a detector coupled to the blocking member and configured to determine whether the surface of the blocking member is detected.

2. The assembly as set forth in claim 1 further including a controller in communication with the actuator and configured to receive information regarding the position of the blocking member due to movement from the actuator moving the blocking member, and the controller is in communication with the detector and configured to receive information regarding whether the surface of the blocking member is detected via the detector.

3. The assembly as set forth in claim 2 wherein the blocking member is disposed in a breakaway position in response to a force applied to the blocking member, and wherein the breakaway position is detected via the detector and the breakaway position is communicated to the controller.

4. The assembly as set forth in claim 3 wherein the surface of the blocking member is movable to the breakaway position.

5. The assembly as set forth in claim 3 wherein at least part of the surface of the blocking member is detachable from the support structure when in the breakaway position.

6. The assembly as set forth in claim 3 further including an indicator in communication with the controller, and wherein the indicator activates when the controller communicates to the indicator that the blocking member is in the breakaway position.

7. The assembly as set forth in claim 1 wherein:
the blocking member includes a first side and a second side opposing the first side;
the blocking member is movable between the extended position and the retracted position to change a direction of the airflow relative to the first side of the blocking member; and
the surface is disposed along one of the first side and the second side.

8. The assembly as set forth in claim 7 wherein the detector includes a sensor configured to determine whether the surface of the first side of the blocking member is detected.

9. The assembly as set forth in claim 8 wherein the sensor includes a load sensor configured to determine whether the surface of the first side of the blocking member is detected.

10. The assembly as set forth in claim 8 wherein the sensor includes a brake sensor configured to determine whether the surface of the first side of the blocking member is detected.

11. The assembly as set forth in claim 8 wherein the sensor includes a plurality of sensors configured to determine whether the surface of the first side of the blocking member is detected.

12. The assembly as set forth in claim 7 wherein the detector includes a switch configured to determine whether the surface of the first side of the blocking member is detected.

13. The assembly as set forth in claim 7 wherein the detector includes a laser configured to determine whether the surface of the first side of the blocking member is detected.

14. The assembly as set forth in claim 7 wherein the detector includes a camera configured to determine whether the surface of the first side of the blocking member is detected.

15. The assembly as set forth in claim 7 wherein the detector includes a pitot tube configured to determine whether the airflow that passes the surface of the blocking member is detected.

16. The assembly as set forth in claim 7 wherein the detector includes an inertia measurement unit configured to determine whether the surface of the first side of the blocking member is detected.

17. The assembly as set forth in claim 1:
further including a controller in communication with the actuator and configured to receive information regarding the position of the blocking member due to the actuator moving the blocking member, and the controller is in communication with the detector and configured to receive information regarding whether the surface of the blocking member is detected via the detector;
wherein the blocking member is disposed in a breakaway position in response to a force applied to the blocking member;
wherein the breakaway position is detected via the detector and communicated to the controller;
further including an indicator in communication with the controller;

wherein the indicator activates when the controller communicates to the indicator that the blocking member is in the breakaway position;
wherein the blocking member includes a first side and a second side opposing the first side;
wherein the blocking member is movable between the extended position and the retracted position to change a direction of the airflow relative to the first side of the blocking member; and
wherein the surface is disposed along the first side of the blocking member.

18. A method of monitoring an adjustable aerodynamic assembly, the method comprising:
determining whether a surface of a blocking member is detected via a detector, wherein the blocking member is supported by a support structure and the detector is coupled to the blocking member, and wherein the blocking member is movable between an extended position in which the blocking member is disposed transverse to the support structure to interact with an airflow and a retracted position in which the blocking member retracts to minimize interaction with the airflow, and wherein the blocking member is movable between the extended position and the retracted position about a single pivot point; and
selectively activating an actuator to move the blocking member to the extended position and the retracted position, wherein the actuator is coupled to the blocking member.

19. The method as set forth in claim 18 further comprising communicating between the actuator and a controller information regarding the position of the blocking member due to the actuator moving the blocking member, and communicating between the detector and the controller information regarding whether the surface of the blocking member is detected via the detector.

20. The method as set forth in claim 18:
further comprising communicating between the actuator and via a controller information regarding the position of the blocking member due to the actuator moving the blocking member, and communicating between the detector and the controller information regarding whether the surface of the blocking member is detected via the detector;
further comprising disposing the blocking member in a breakaway position in response to a force applied to the blocking member, and wherein the breakaway position of the blocking member is different from the position that the actuator disposed the blocking member in;
wherein determining whether the surface of the blocking member is detected further comprises detecting the breakaway position via the detector and communicating the breakaway position to the controller;
further comprising activating an indicator when the controller receives information that the blocking member is in the breakaway position by comparing the information between the actuator and the detector;
wherein the blocking member includes a first side and a second side opposing the first side;
wherein the blocking member is movable between the extended position and the retracted position to change a direction of the airflow relative to the first side of the blocking member; and
wherein the surface is disposed along the first side of the blocking member.

* * * * *